US007862301B2

(12) United States Patent
Wu

(10) Patent No.: US 7,862,301 B2
(45) Date of Patent: Jan. 4, 2011

(54) LAMINATED IMPELLER

(76) Inventor: Weiguo Wu, Zhejiang Fordy Machinery Co., Ltd., 288, Huanxi Rd., Jinqing Town, Luqiao District, Taizhou, Zhejiang (CN) 318058

( * ) Notice: Subject to any disclaimer, the term of this patent is extended or adjusted under 35 U.S.C. 154(b) by 832 days.

(21) Appl. No.: 11/767,716

(22) Filed: Jun. 25, 2007

(65) Prior Publication Data
US 2007/0297906 A1    Dec. 27, 2007

(30) Foreign Application Priority Data
Jun. 27, 2006   (CN)   ................. 2006 1 0093478

(51) Int. Cl.
*B64C 11/00* (2006.01)
(52) U.S. Cl. .............................. 416/198 R; 416/220 R; 416/231 A
(58) Field of Classification Search ............ 416/198 R, 416/201 R, 201 A, 203, 210 R, 220 R, 231 R, 416/231 B, 231 A
See application file for complete search history.

(56) References Cited
U.S. PATENT DOCUMENTS
1,175,162 A * 3/1916 McMurdie ................. 416/184
6,634,784 B2 * 10/2003 Blakley ..................... 366/330.2
7,083,386 B2 * 8/2006 Horng et al. ................ 416/175
2006/0263198 A1 * 11/2006 Toby Kinkaid .............. 415/4.2

* cited by examiner

*Primary Examiner*—Edward Look
*Assistant Examiner*—Jesse Prager
(74) *Attorney, Agent, or Firm*—Global IP Services; Tianhua Gu

(57) ABSTRACT

The present invention relates generally to impeller of aerators, and more particularly to a laminated impeller of paddle-wheel aerator. To solve the shortcoming of existing impeller of aerator: single-body structure, large volume, complicated manufacturing technique and high production cost, fixed blade quantity and axial length, narrow application range and inferior universal use, the present invention provides a laminated impeller that is characterized by simple structure, easy installation and better universal use. The technical scheme of the present invention comprises single impeller body consisting of impeller seat and blade connecting on the seat, a plurality of single impeller body connected in succession to form a laminated impeller, connecting mechanism provided on impeller seat to connect neighboring single impeller, axial impeller length adjusted according to the power needed actually and blade quantity changed to meet wider application.

9 Claims, 9 Drawing Sheets

LAMINATED IMPELLER

CROSS REFERENCE TO THE RELATED PATENT APPLICATION

This application claims the priority of the Chinese patent application No. 200610093478.9, filing date of Jun. 27, 2006.

FIELD OF THE INVENTION

The invention relates generally to impeller of aerators, and more particularly to a laminated impeller of paddlewheel aerator.

BACKGROUND OF THE INVENTION

Aerator is a common aquicultural apparatus to help fish and shrimp living and growing. The existing mechanical aerators are divided into three types: paddlewheel aerator, impeller aerator and injector aerator, among which paddlewheel aerator is more widely used. The existing impeller of paddlewheel aerator is featured by single-body structure, large volume, complicated manufacturing technique and high production cost; and due to fixed blade quantity and axial length, it is inferior in application range and universal use.

SUMMARY OF THE INVENTION

An object of the present invention is to provide a laminated impeller of simple structure, easy installation and better versatility to solve the shortcoming of existing paddlewheel aerator. The axial length of impeller is adjustable and impeller quantity can be selected according to different powers, thus expanding its applicable range.

The technical proposal is a laminated impeller comprising impeller seat and blades connecting to said seat to form a single impeller body, wherein a plurality of impeller bodies is connected in succession to form an impeller, and each impeller seat is provided integrally with a mechanism to connect adjacent single impeller body. According to the present invention, a plurality of single impeller body are connected in succession by said mechanism to combine the impeller of composite structure. By adding or reducing the number of single impeller body connected in succession, the axial length of impeller can be adjusted and number of blade can be changed, thus meeting the needs of actual power and expanding versatility and applications.

The said connecting mechanism according to the present invention is a bell and spigot coupler with spigot at one end face and bell at the other end face. By bell and spigot coupling between neighboring single impellers, a plurality of single impeller body are connected in succession. In such a way, the assembly and disassembly of single impeller body is convenient.

The impeller seats are divided into main impeller seat and auxiliary impeller seat. Boss-shape drive shaft hole is provided in said main impeller seat. Supporting ribs are provided between drive shaft hole and impeller rim. Main impeller seat and auxiliary impeller seat are connected each other. Drive shaft hole is boss shaped with a considerable thickness to effectively increase the connecting area between main drive shaft and shaft hole, ensure more reliable transmission of driving force and prevent excessive shake in impeller operation. Supporting ribs can strengthen supporting intensity of impeller rim. Additionally, main impeller seat after connecting blades can be used as independent impeller. Auxiliary impeller seat is normally used in combination with main impeller seat, and can also be used independently with end cover that has drive shaft hole in side end.

Said spigot and bell of the present invention are positioned in staggered arrangement. Said boss-shaped drive shaft hole is provided with a reinforcing sheath. A recess provided with radial through hole is set in the outer fringe. A nut is pre-mounted in the recess and a screw is set on said nut. Since spigot and bell of the present invention are positioned in staggered arrangement, after a plurality of single impeller is connected in succession, the couplers are spirally distributed so that impellers are more evenly driven in the whole during operation. Joining screw and pre-mounted nut can ensure connection between drive shaft and shaft hole. The reinforcing sheath outside shaft hole can strengthen the intensity of shaft hole and improve the reliability of connection between drive shaft and shaft hole. When impeller body and seat are made of plastics, reinforcing sheath made of stretched stainless steel sheet provides a better effect.

Said spigot and bell coupler of the present invention is hollow coupler positioned at the outside of impeller rim. Radial holder with positioning groove is provided on the bell and spigot coupler. Elastic catch is provided in the connecting end of said blade. Said connecting end is to plug into the holder and elastic catch is to snap in the positioning groove. Insert the blade into holder and by matching the elastic catch of connecting end and the positioning groove of holder, secure the blade in the impeller rim. In addition, said holder can also be directly provided on the impeller rim in the same way as provided on the holder.

Moreover, such a structure can also be designed for the present invention: said impeller seat is hollow. After a plurality of impeller seat are connected in succession, at least an end cover is installed at its side end. Said hollow impeller is simple in structure, economical in material and convenient in manufacture. By joining end cover at side end and drive shaft, driving force is transferred orderly to each impeller seat connected in succession and brings the rotation of impellers. After a plurality of impeller seat are connected in succession, end covers installed at both ends can further strengthen the connection of impeller seats in between.

Said bell and spigot coupler of the present invention is hollow coupler positioned in the inside of impeller rim. Bell and spigot are in coaxial arrangement. End cover is connected to said bell and spigot coupler with long double-ended bolts. Coaxial arrangement of bell and spigot is easier made than staggered arrangement. Since impeller seat is hollow structured and light weighted, after a plurality of single impeller are connected in succession, all neighboring couplers are in linear coaxial arrangement to ensure stable operation of impeller.

Said blades and bell and spigot couplers of the present invention are evenly distributed in the impeller seat. The angle between two neighboring blades is larger than that between two neighboring bell and spigot couplers. At least a blade and a coupler are in staggered arrangement. Such an arrangement can ensure neighboring single impeller bodies in staggered arrangement to form connected impeller with its blades axially distributed in spiral arrangement. During operation, impellers can be more evenly driven in the whole to improve the performance of impeller.

Said blade of the present invention is provided with a fixing clip at connecting end, and the impeller rim is provided with a notch to match the fixing clip. By matching said fixing clip and notch, blade is connected to impeller rim. Such a fixedly joining way is simple in structure and reliable in connection. Additionally, other joining ways such as screw, welding and bonding can also be used between blades and impeller rim.

Said blades of the present invention are integrally connected to impeller rim such as by injection molding so that integrally blades and impeller rim have higher intensity.

Said end cover of the present invention is provided with axial seat at its outside, and elastomer is provided between the outside of end cover and axial seat. Said elastomer is used to reduce the vibration of impeller during operation and correct coaxiality error caused in the installation.

Said laminated impeller of the present invention is characterized by said connecting mechanism with internal thread and external thread on two ends of impeller rim. By matching threads, the single impellers are connected in succession.

In addition, discharge groove can be opened in impeller seat to avoid internal water reservation during impeller operation and save material. Blades can be manufactured in various shapes such as angular shape, curve shape and plate shape to meet aerating needs at different conditions.

The present invention changes normal integral impeller structure. By connecting a plurality of single impeller to form a laminated impeller and adjusting the number of connected single impeller, the present invention can adjust axial length of impeller and the number of blade to meet different needs, so that it provides better versatility and wider applicable range.

Hereunder is further description of the present invention in combination with figure and preferred embodiment.

Figure 1:
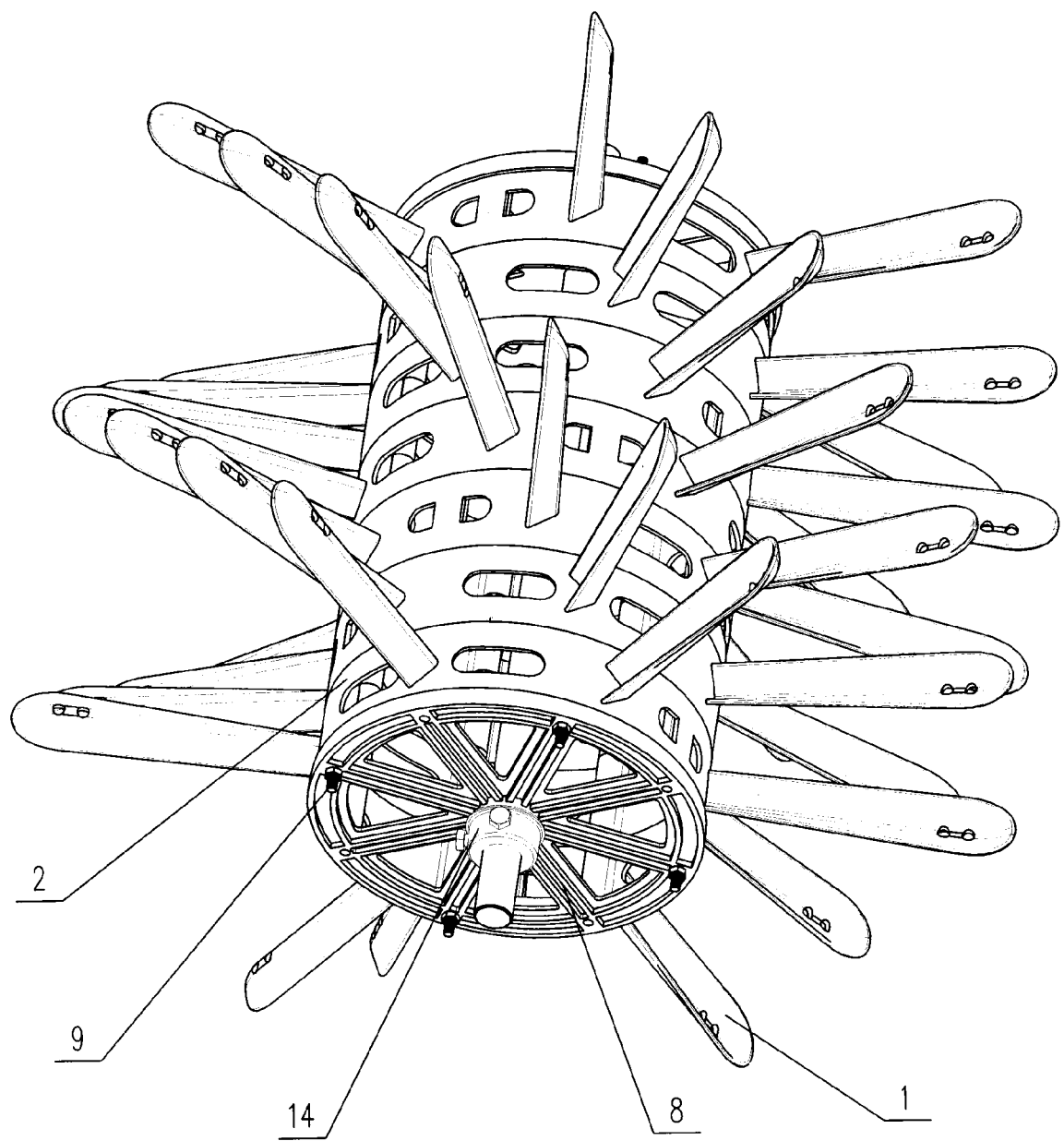
FIG. 1: Schematic view of laminated impeller of Embodiment 1.
Figure 2:
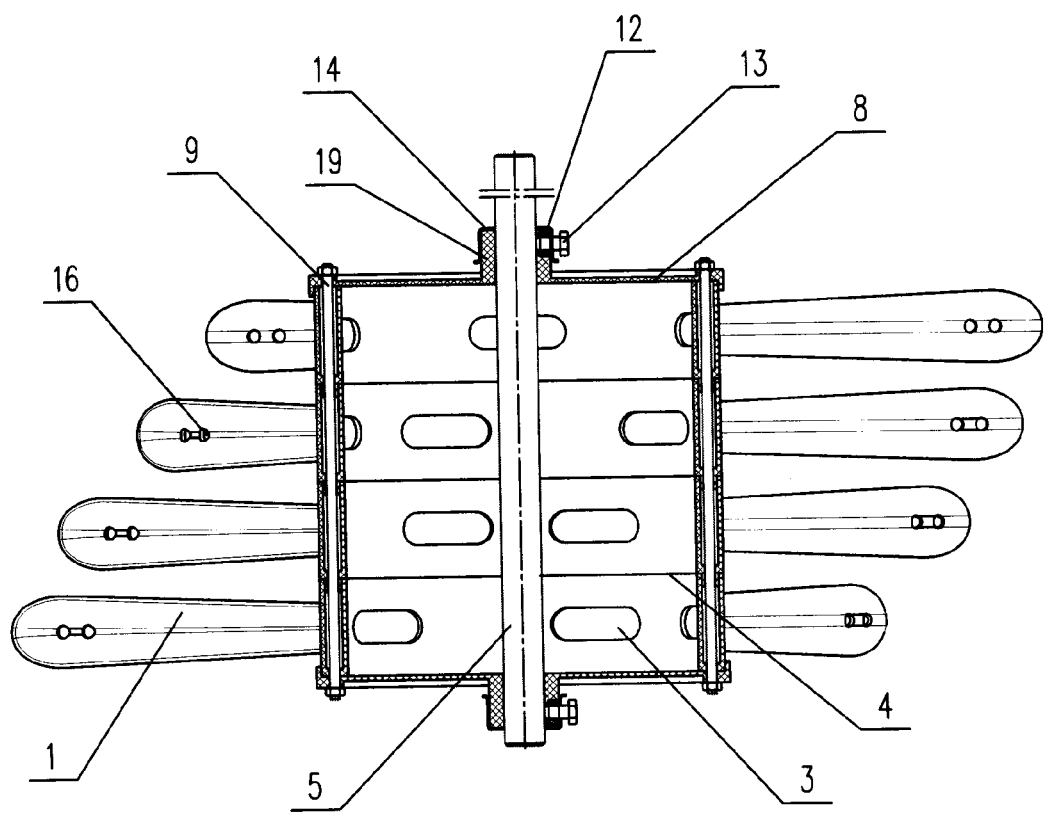
FIG. 2: Cutaway view of laminated impeller of Embodiment 1.
Figure 3:
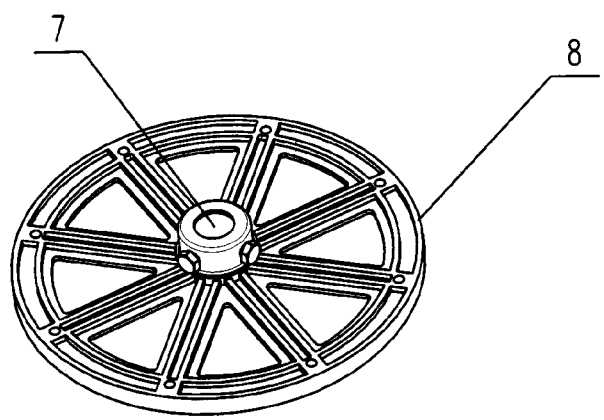
FIG. 3: Schematic view of end cover of Embodiment 1.
Figure 4:
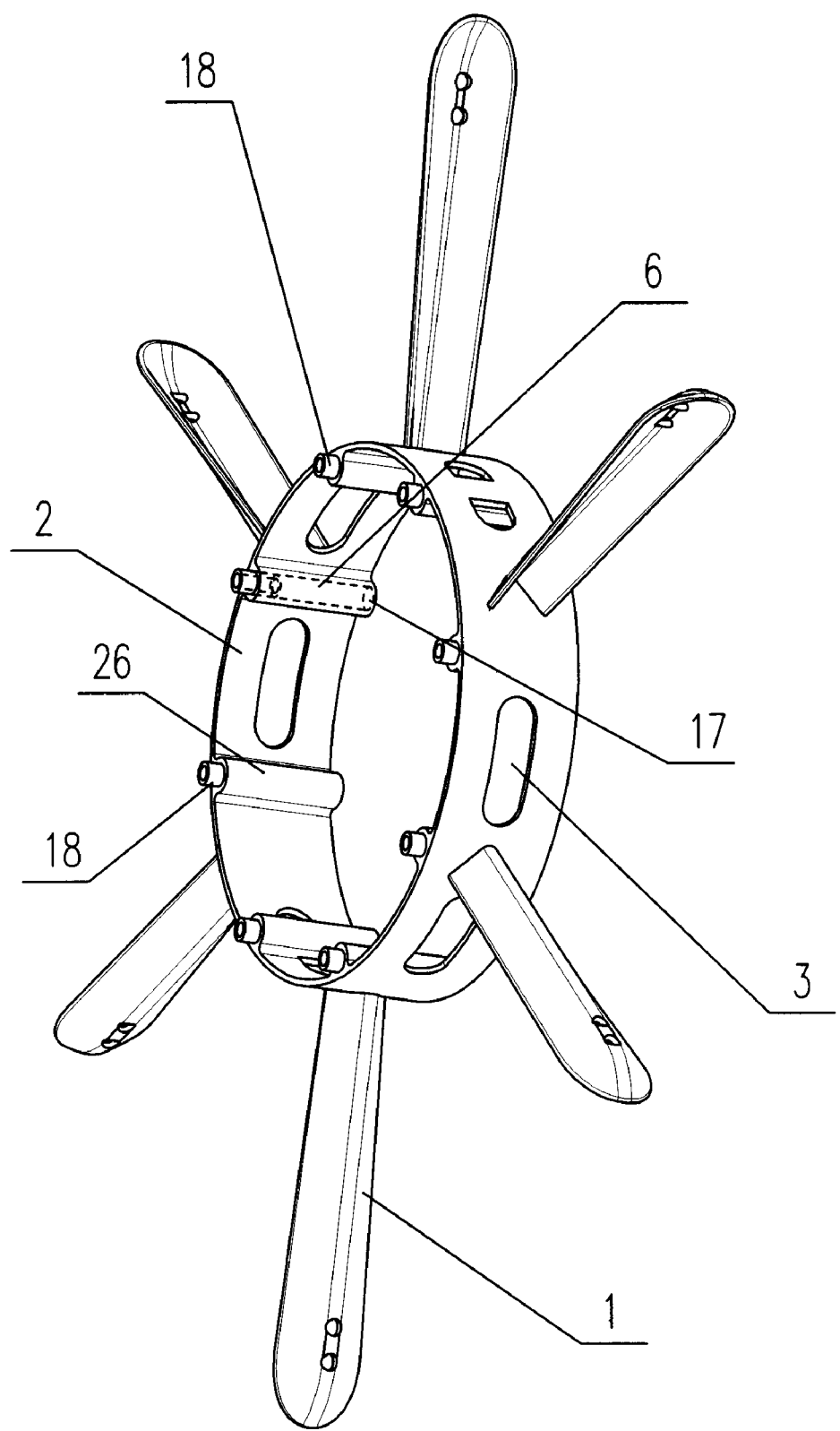
FIG. 4: Schematic view of single impeller body with blade of Embodiment 1.
Figure 5:
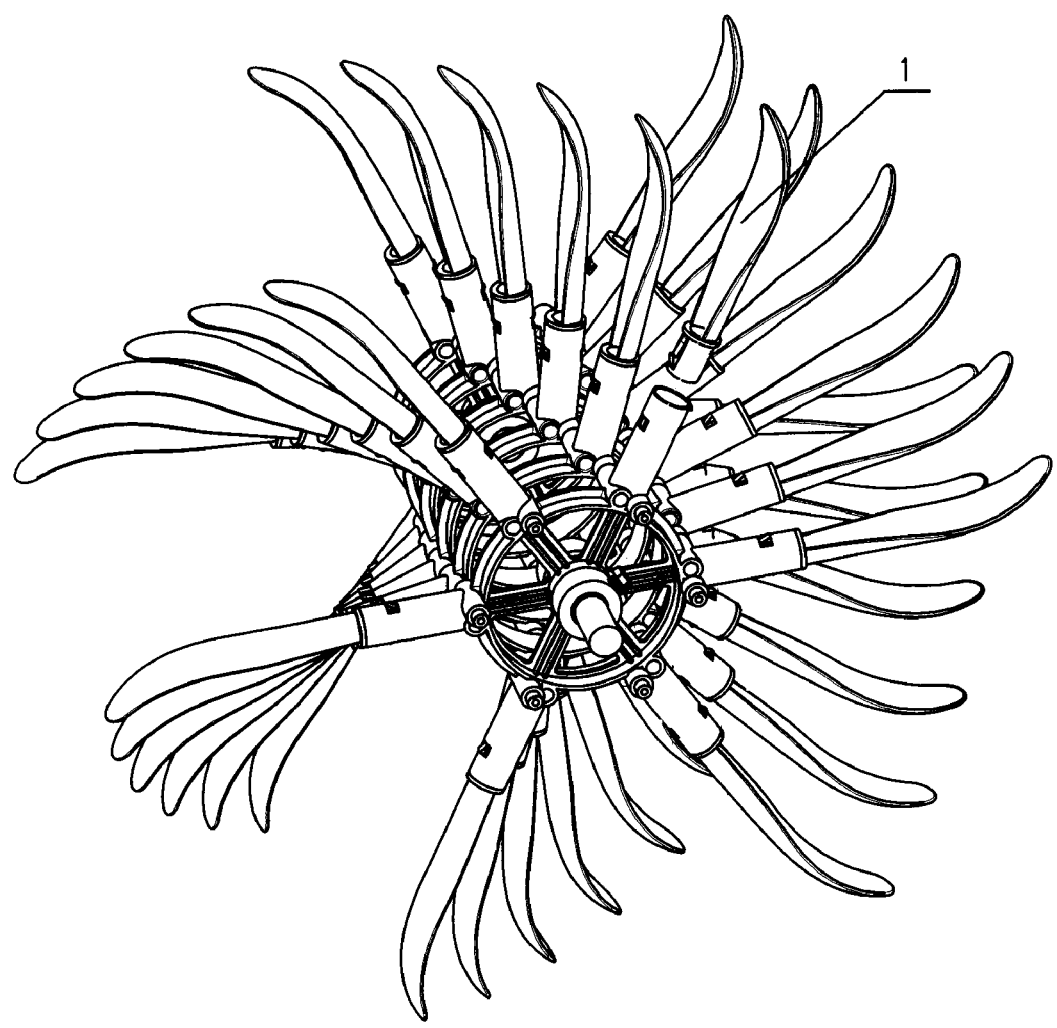
FIG. 5: Schematic view of laminated impeller of Embodiment 2.
Figure 6:
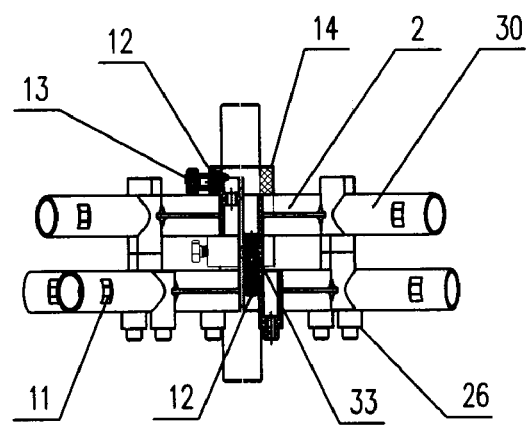
FIG. 6: Schematic view of single impeller bodies connected in succession of Embodiment 2.
Figure 7:
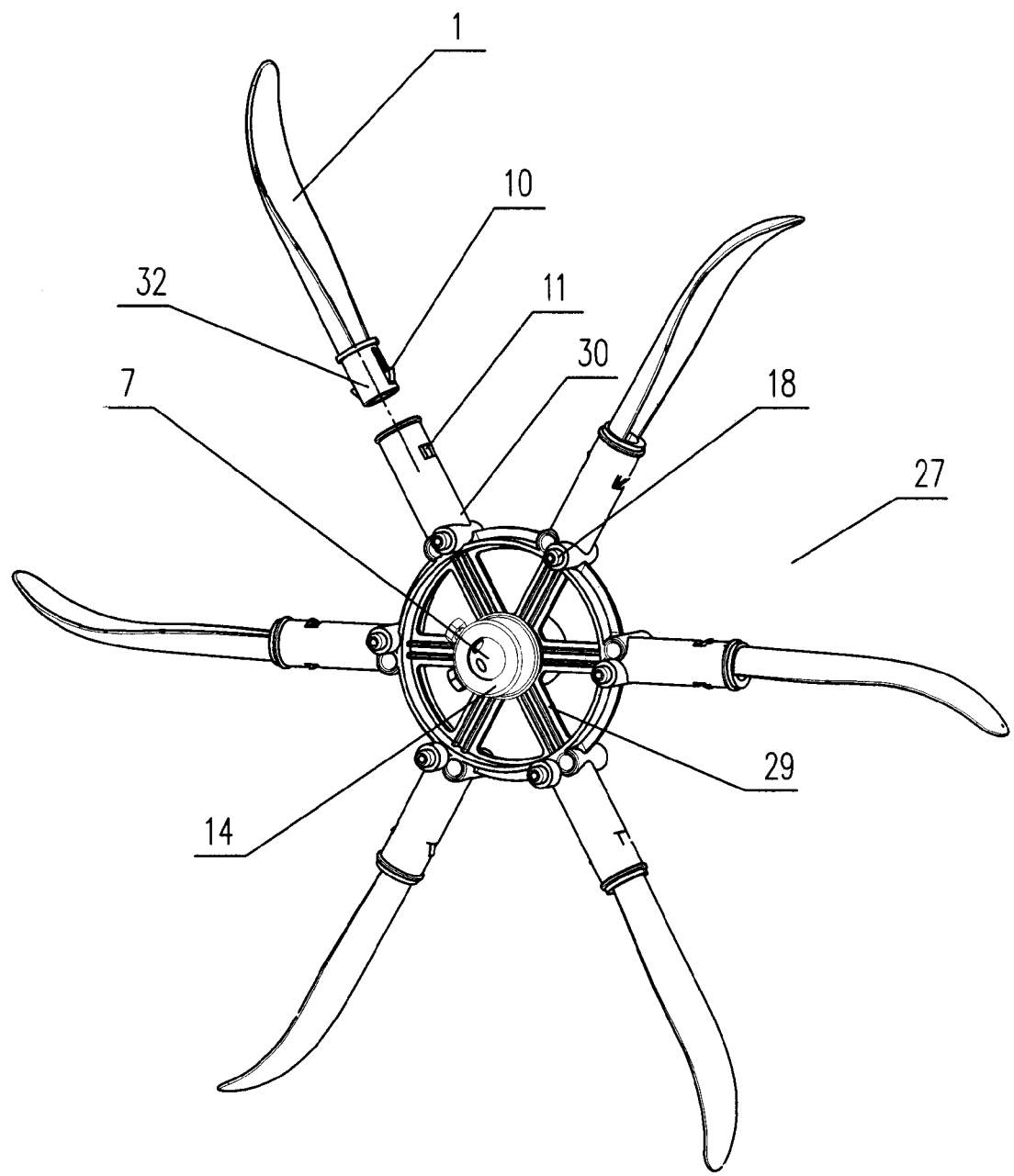
FIG. 7: Schematic view of main impeller seat with blades of Embodiment 2.
Figure 8:
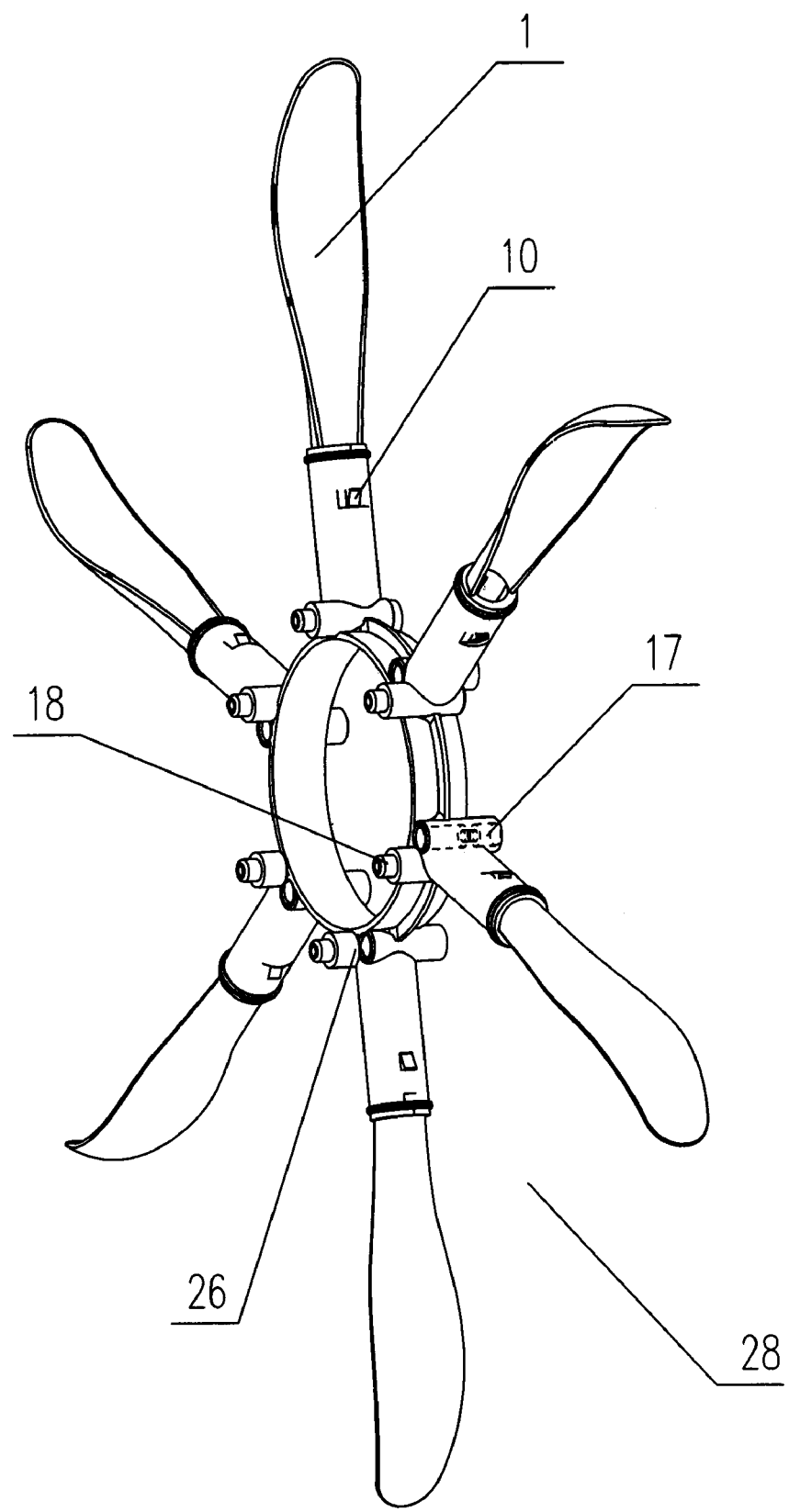
FIG. 8: Schematic view of auxiliary impeller seat with blades of Embodiment 2.

Legend: 1. blade, 2. impeller seat, 3. discharge groove, 4. connecting interface, 5. drive shaft, 6. through hole, 7. shaft hole, 8. end cover, 9. long double-ended bolt, 10. elastic catch, 11. positioning groove, 12. nut, 13. screw, 14. reinforcing sheath, 15. float, 16. discharge orifice, 17. bell, 18. spigot, 19. axial seat, 20. bearing block, 21. motor, 22. reducer, 23. elastomer, 24. output shaft, 25 snap-in notch, 26. bell and spigot coupler, 27. main impeller seat, 28. auxiliary impeller seat, 29. supporting rib, 30. holder, 31. fixing clip, 32. connecting end, 33. bolt.

DETAIL DESCRIPTION OF THE INVENTION

Embodiment 1

The laminated impeller shown in FIG. 1 to 4 comprises a plurality of single impeller body connected in succession. Said single impeller body consists of impeller seat 2 and blades 1 integrally connecting to and evenly distributed on the seat. Discharge orifices 16 are provided in the blades. Impeller seat 2 is of ring structure and discharge groove 3 are provided in the impeller seat. Both end faces are connecting faces 4. Connecting mechanism is provided in said impeller seat 2 and evenly distributed on hollow bell and spigot coupler 26 on the rim of impeller seat 2. A through hole 6 is provided in the coupler. Spigot 18 is provided on one end face and bell 17 on the other end face.

After a plurality of single impeller are connected in succession, end covers 8 are mounted on both ends. Boss-shaped drive shaft hole 7 is provided in the end cover and a metal reinforcing sheath 14 is mounted around the hole 7. A recess provided with radial through hole is opened in the rim of said shaft hole. A nut 12 is pre-mounted in the recess and a screw 13 is set on said nut. Long double-ended bolts 9 penetrate said hollow bell and spigot coupler 26 on the rim, connect both end covers 8 and fasten the plurality of single impeller connected in succession. Axial seat 19 is provided on the outside of end cover 8 and elastomer 23 is provided between the outside of end cover and bearing block.

Figure 11:
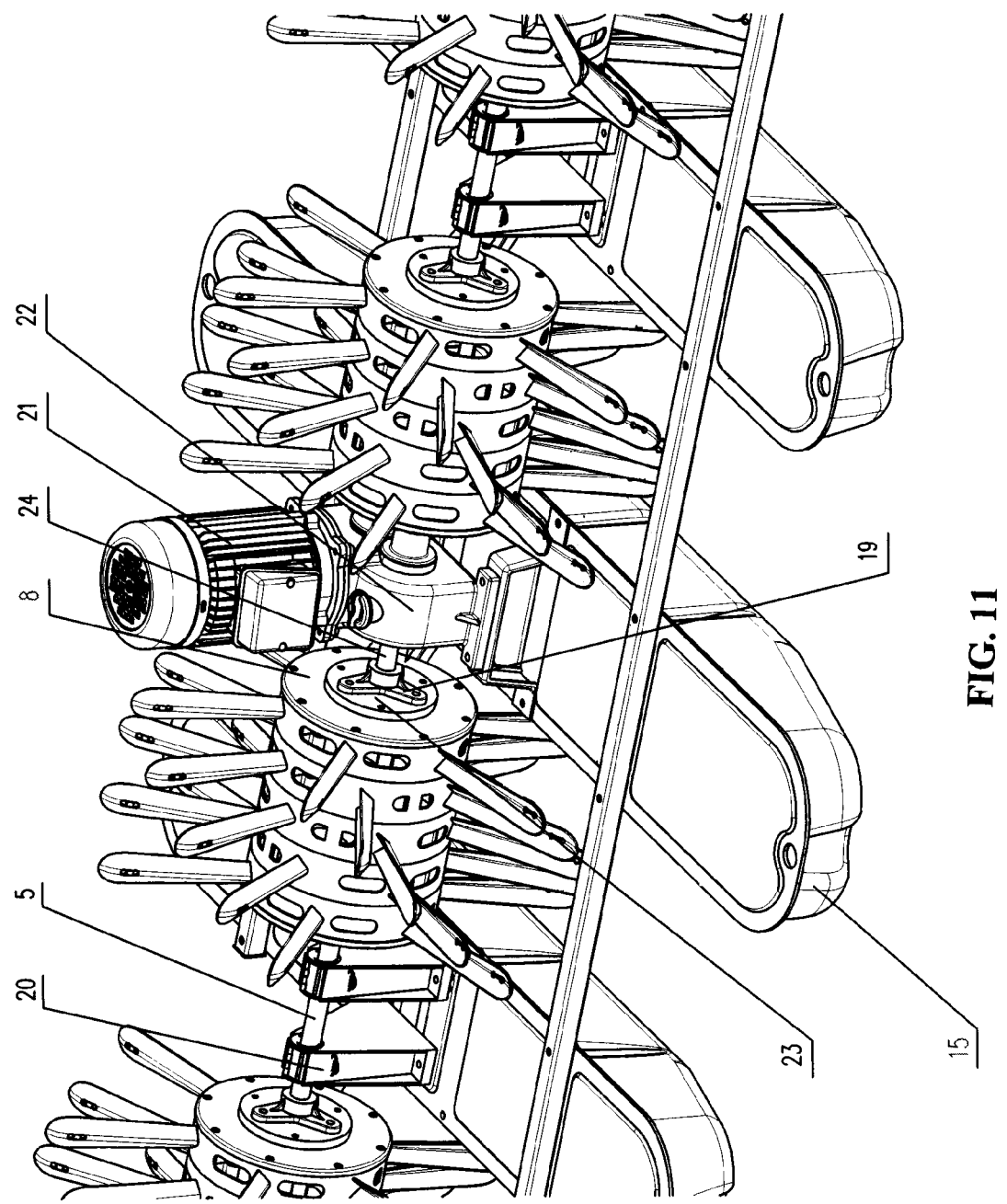
FIG. 11: Schematic view of Embodiment 1 in application.

In the application as shown in FIG. 11, said laminated impeller of paddlewheel aerator can be used in series. Bearing block 20, motor 21 and reducer 22 are mounted on a float 15. Laminated impellers are mounted between bearing block and reducer. Output shaft 24 is used to drive axial seat 19. Via elastomer 23 axial seat 19 drives end cover 8 to rotate the impeller near motor. Another laminated impeller is mounted between two neighboring bearing blocks, and transmission shaft 5 is used to transfer drive between impellers.

Embodiment 2 a laminated impeller as shown in FIG. 5 to 8, comprises a plurality of single impeller connected in succession. Said single impeller body consists of impeller seat 2 and blades 1 evenly distributed on the seat. Impeller seat 2 is provided with a connecting mechanism to connect neighboring single impeller. Said connecting mechanism is hollow bell and spigot coupler 26 on the rim of impeller seat 2. Spigot 18 is provided on one end face and bell 17 on the other end face. Spigot 18 and bell 17 are positioned in staggered arrangement. Radial holder 30 with a positioning groove 11 is mounted on the bell and spigot coupler. Elastic catch 10 is provided in the connecting end 32. Said connecting end is to plug in the holder and elastic catch is to snap in the positioning groove.

Said impeller seat 2 is divided into main impeller seat 27 and auxiliary impeller seat 28. Boss-shaped drive shaft hole 7 is provided in the main impeller seat and a metal reinforcing sheath 14 is mounted around the hole 7. A recess provided with radial through hole is opened in the rim of said shaft hole. A nut 12 is pre-mounted in the recess and a screw 13 is set on said nut. Supporting ribs 29 are provided between drive shaft hole and rim. Main impeller seat and auxiliary impeller seat are connected each other. Bolt 33 and nut 12 are mounted in connected bell and spigot coupler to fasten the connection.

Embodiment 3

Figure 9:
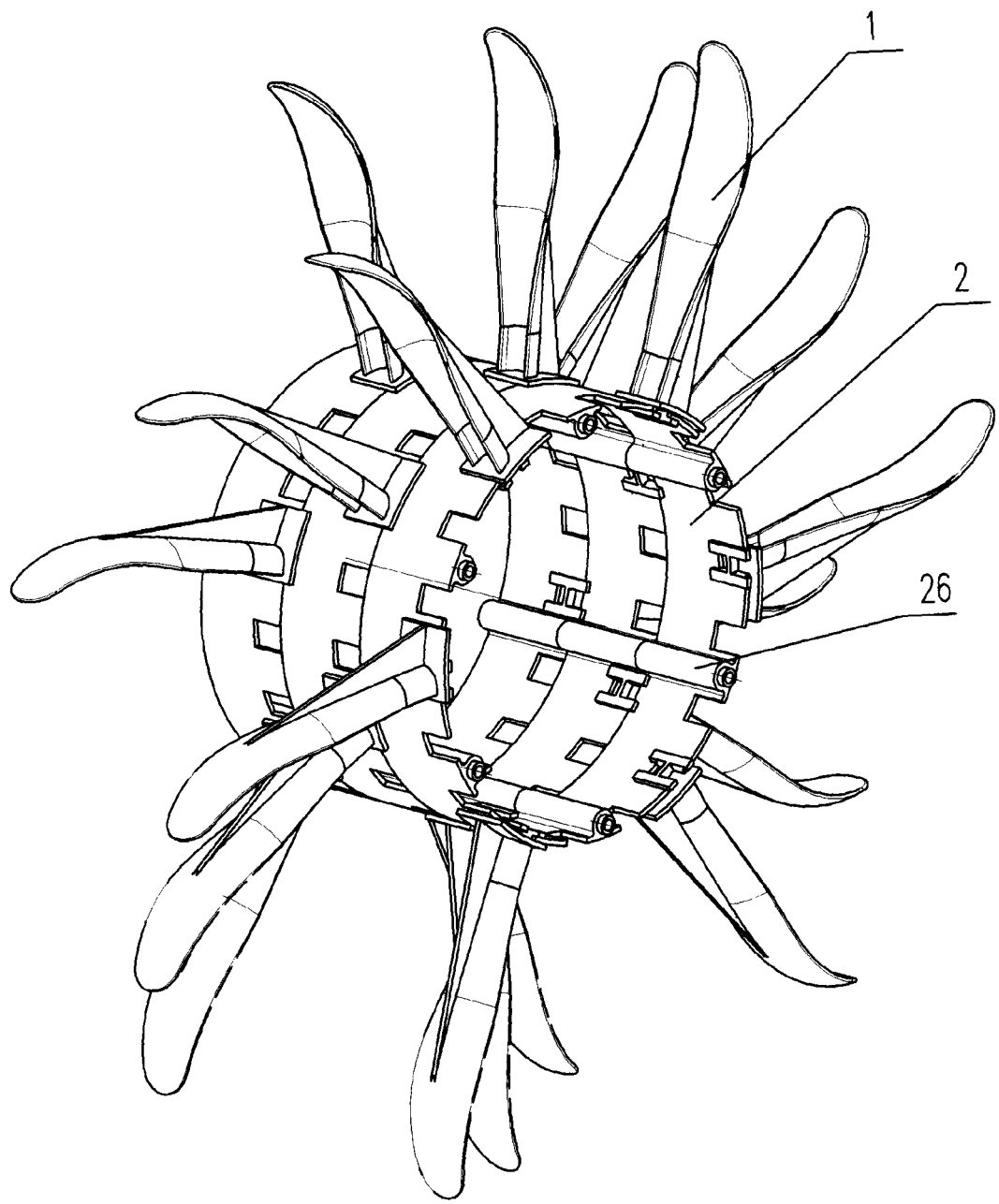
FIG. 9: Schematic view of laminated impeller of Embodiment 3, with end cover removed.
Figure 10:
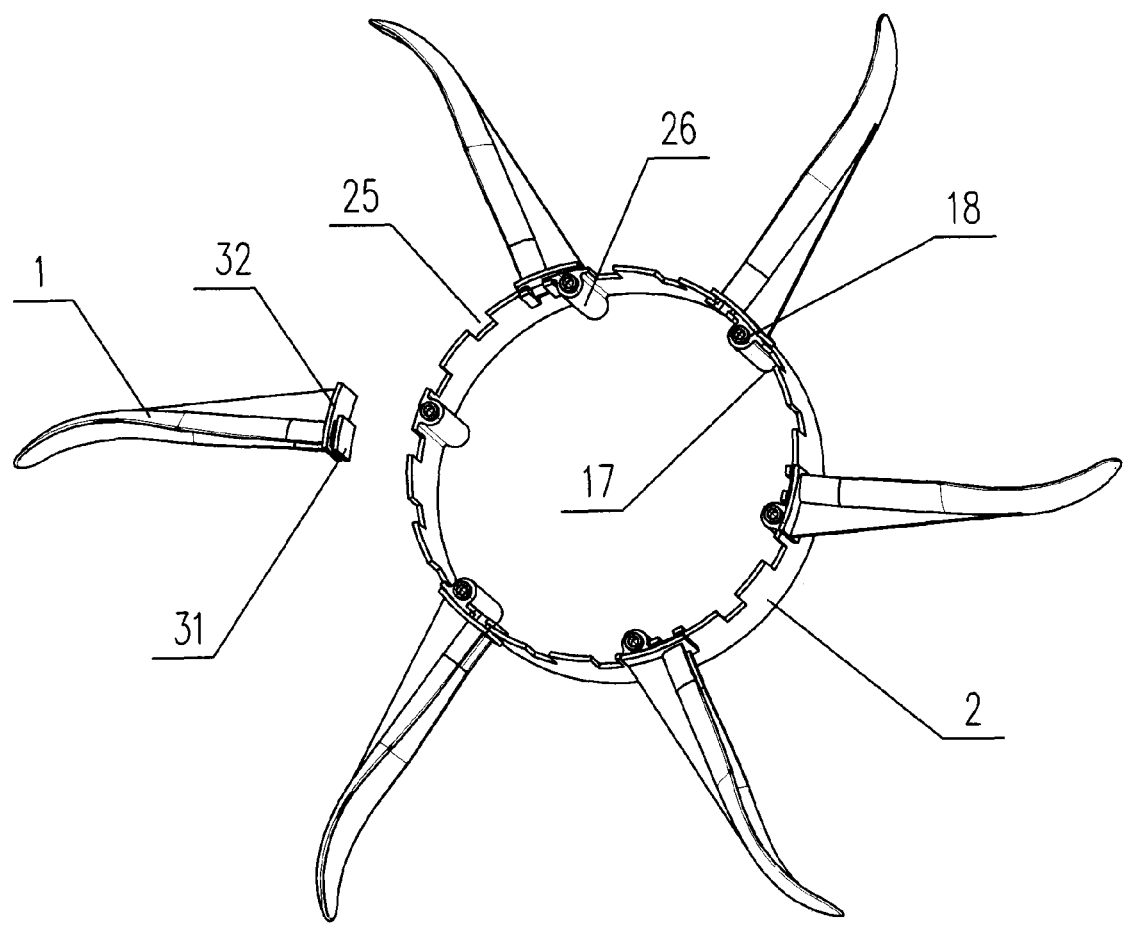
FIG. 10: Schematic view of single impeller body with blades of Embodiment 3.

The laminated impeller shown in FIGS. 9 and 10 comprises a plurality of single impeller body connected in succession. Said single impeller body consists of impeller seat 2 and blades 1 evenly distributed on the seat. A fixing clip 31 is provided in connecting end 32 of blade and notches 25 are evenly distributed on the impeller rim. Blade 1 is matched into the notches of rim by fixing clips. Connecting mechanisms are provided in the impeller seat 2 to connect neighboring single impeller body. Said connecting mechanism is hollow bell and spigot coupler 26 on the rim of impeller seat 2. Spigot 18 is provided on one end face and bell 17 on the other end face coaxially.

After a plurality of impeller seat are connected in succession, at least one end cover (not shown in the figure) with drive shaft hole in side is mounted. Said end cover is connected to bell and spigot coupler with long double-ended bolts. Said bolts penetrate all connected seats. Refer to the end cover connection in Embodiment 1.

What is claimed is:

1. A laminated impeller comprising an impeller seat, a plurality of blades connected on said impeller seat to form a single impeller body, wherein a plurality of said single impeller bodies being connected in succession to form said laminated impeller, each said impeller seat being provided with a connecting mechanism for connecting adjacent said single impeller body;

said connecting mechanism is a bell and spigot coupler on a rim of said impeller seat, the spigot on one end face and the bell on the other end face;

said impeller seats are divided into a main impeller seat with a boss-shaped shaft hole and auxiliary impeller seats, the boss-shaped shaft hole is connected with the rim by supporting ribs, said main impeller seat and said auxiliary impeller seat are connected with each other;

said bell and said spigot are positioned in staggered arrangement, a reinforcing sheath is mounted around said boss-shaped shaft hole, a recess provided with radial through hole opened in the outer fringe and a nut pre-mounted in the recess and a screw set on said nut.

2. A laminated impeller as claimed in claim 1, wherein said bell and spigot coupler is a hollow coupler positioned at outside of the rim, a radial holder with a positioning groove is provided on said bell and spigot coupler, an elastic catch is provided in a connecting end of said blade, the connecting end is plugged in said radial holder and said elastic catch is snapped in said positioning groove.

3. A laminated impeller as claimed in claim 1, wherein said impeller seat is a hollow impeller seat, a plurality of said hollow impeller seat are connected in succession, at least an end cover with drive shaft hole is mounted at one side.

4. A laminated impeller as claimed in claim 3, wherein said bell and spigot coupler is a hollow coupler positioned at the inside of the rim with bell and spigot in coaxial arrangement, an end cover is connected to said bell and spigot coupler by long bolts.

5. A laminated impeller as claimed in claim 4, wherein said blade and said bell and spigot coupler are evenly distributed on said impeller seat, the angle between two neighboring said blades is larger than that between two neighboring said bell and spigot couplers, at least one of said blade and one of said bell and spigot coupler are in staggered arrangement.

6. A laminated impeller as claimed in claim 5, wherein said blade is provided with a fixing clip in its connecting end and said rim provided with a notch, said blades matched to the notch by the fixing clip.

7. A laminated impeller as claimed in claim 5, wherein said blade is fixedly connected to said rim.

8. A laminated impeller as claimed in claim 3, wherein said end cover is provided with an axial seat at its outside and an elastomer is provided between the outside of said end cover and said axial seat.

9. A laminated impeller as claimed in claim 1, wherein said connecting mechanism is an internal thread and an external thread on two ends of said impeller rim respectively.

* * * * *